US012703193B2

(12) United States Patent
Nakamura et al.

(10) Patent No.: US 12,703,193 B2
(45) Date of Patent: Aug. 11, 2026

(54) PRINTING APPARATUS, PRINTING METHOD, AND STORAGE MEDIUM

(71) Applicant: CANON KABUSHIKI KAISHA, Tokyo (JP)

(72) Inventors: Takuma Nakamura, Tokyo (JP); Masahiro Sugimoto, Kanagawa (JP); Yuichiro Yanagi, Chiba (JP); Junichi Ochi, Shizuoka (JP); Kota Kawasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 159 days.

(21) Appl. No.: 18/672,260

(22) Filed: May 23, 2024

(65) Prior Publication Data

US 2024/0399771 A1 Dec. 5, 2024

(30) Foreign Application Priority Data

May 30, 2023 (JP) ................................. 2023-088968

(51) Int. Cl.
*B41J 11/46* (2006.01)
*B41J 2/155* (2006.01)
(Continued)

(52) U.S. Cl.
CPC ............... *B41J 11/46* (2013.01); *B41J 2/155* (2013.01); *B41J 2/2135* (2013.01); *B41J 2/2146* (2013.01); *B41J 11/008* (2013.01); *B41J 2202/21* (2013.01)

(58) Field of Classification Search
CPC ...... B41J 11/46; B41J 11/008; B41J 2202/21; B41J 2/155; B41J 2/2135; B41J 2/2146
See application file for complete search history.

(56) References Cited

U.S. PATENT DOCUMENTS 9,387,670 B1 * 7/2016 Kelly, III ............. B41J 2/04573
10,444,687 B2 10/2019 Sasami
(Continued)

FOREIGN PATENT DOCUMENTS

ES 2931900 A 1/2023
JP 2010-121941 A 6/2010
(Continued)

OTHER PUBLICATIONS

European Search Report dated Nov. 12, 2024, in related European Patent Application No. 24178151.7.

*Primary Examiner* — Jason S Uhlenhake
(74) *Attorney, Agent, or Firm* — VENABLE LLP

(57) ABSTRACT

A printing apparatus detects a first mark on a continuous sheet indicating a formation position of an image, prints a plurality of color planes corresponding to the image in an overlapping manner at the formation position, and prints a plurality of second marks corresponding to each of the plurality of color planes. The printing start timing of the color plane is adjusted to resolve a shift in each of the color planes based on a calculated positional shift amount. The plurality of second marks overlaps the first mark in the sheet width direction. Where the number of plurality of color planes is M, M second marks are printed side by side between the first marks adjacent to each other in the sheet conveyance direction, and the positional shift amount is calculated by taking detected M marks as the second mark by switching operation modes based on the color of the detected mark.

13 Claims, 14 Drawing Sheets

(51) Int. Cl.
*B41J 2/21* (2006.01)
*B41J 11/00* (2006.01)

(56) References Cited

U.S. PATENT DOCUMENTS

| | | | |
|---|---|---|---|
| 2015/0266326 | A1 | 9/2015 | Sasami |
| 2020/0406639 | A1 | 12/2020 | Yoshida et al. |

FOREIGN PATENT DOCUMENTS

| | | | | |
|---|---|---|---|---|
| JP | 2015-182297 | A | | 10/2015 |
| JP | 6324307 | B2 | | 5/2018 |
| JP | 2019-077043 | A | | 5/2019 |
| JP | 2019142232 | A | * | 8/2019 |

* cited by examiner

PRINTING APPARATUS, PRINTING METHOD, AND STORAGE MEDIUM

BACKGROUND

Field

The present disclosure relates to a printing apparatus forming an image on a sheet.

Description of the Related Art

There is a printing apparatus forming an image by using a print head (line head) of each ink color, in which a plurality of printing elements covering the width of a long sheet (printing medium) is arrayed, and conveying the sheet at a constant speed in the direction perpendicular to the direction in which the printing elements are arrayed. Here, there is a case where it is not possible to obtain desired color reproduction because the image formation position shifts between the line heads due to a tolerance of each individual line head or a line head attachment error, and therefore, dots of different colors that should overlap separate from each other, dots that should separate overlap each other, and so on. For this problem, there is a technique called registration correction (see Japanese Patent Laid-Open No. 2015-182297), which resolves a shift in the image formation position between the line heads by printing a test mark for each color and detecting the test mark with a sensor. Further, there is a printing apparatus compatible with a long sheet, which has a so-called "additional printing" function to print an image anew by detecting a reference mark indicating the position of an image printed in advance on a sheet with a sensor and aligning with the reference mark (see Japanese Patent Laid-Open No. 2019-77043).

In a case where "registration correction" is performed in "additional printing" described above, on a condition that a reference mark and a test mark are formed on a long sheet so that both marks do not interfere with each other to enable detection of both marks, the printable area becomes small, and therefore, there is such a problem that productivity is reduced.

SUMMARY

The present disclosure has been made in order to solve the above-described problem and an object is to secure a sufficiently large printable area in a case where "registration correction" is performed in "additional printing".

The printing apparatus according to the present disclosure is a printing apparatus forming an image on a continuous sheet and includes: a first detection unit configured to detect a first mark on the continuous sheet indicating a formation position of the image; an image formation unit configured to print a plurality of color planes corresponding to the image in an overlapping manner at the formation position indicated by the first mark detected by the first detection unit and print a plurality of second marks corresponding to each of the plurality of color planes on the continuous sheet; a second detection unit configured to detect the plurality of second marks on the continuous sheet; and a control unit configured to adjust printing start timing of the color plane so as to resolve a shift in each of the color planes based on detection results of the plurality of second marks by the second detection unit, wherein the plurality of second marks is printed at an end portion of the continuous sheet so that at least part of the plurality of second marks overlaps the first mark in the sheet width direction.

Further features of the present disclosure will become apparent from the following description of exemplary embodiments with reference to the attached drawings.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

Review of Problem

Before explanation of each embodiment is given, the problem according to the present disclosure is explained by taking a specific example with reference to the drawings, in which in a case where registration correction is performed at the time of additional printing, the printable area becomes small and productivity is reduced. The additional printing is also called "mark detection printing".

Figure 1A:
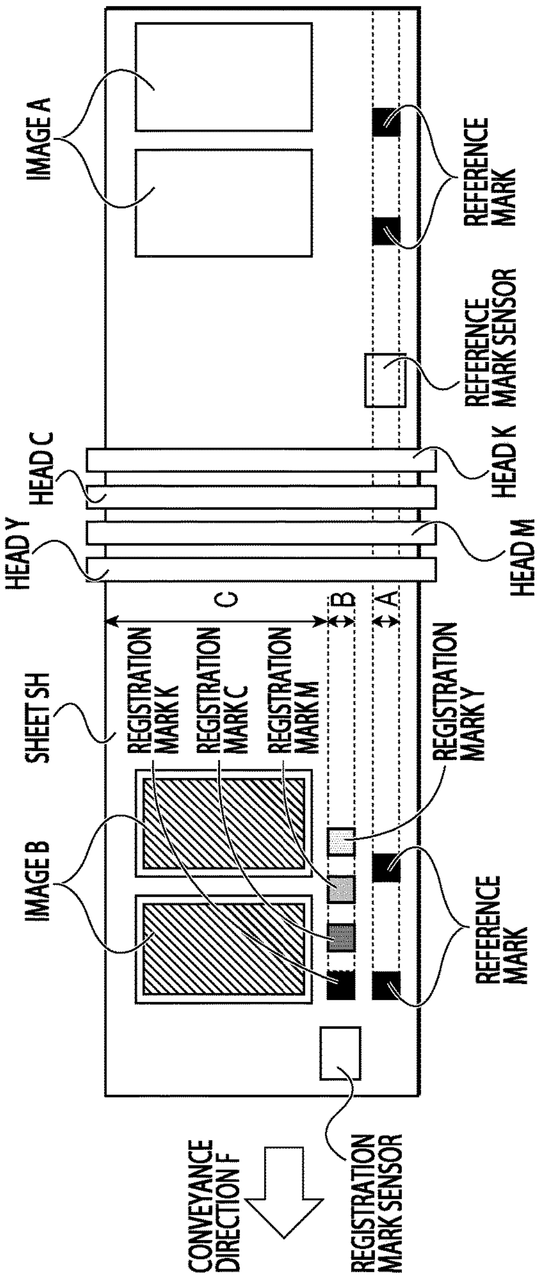
FIG. 1A and FIG. 1B are each a diagram explaining a problem to be solved of the present disclosure.
Figure 1B:
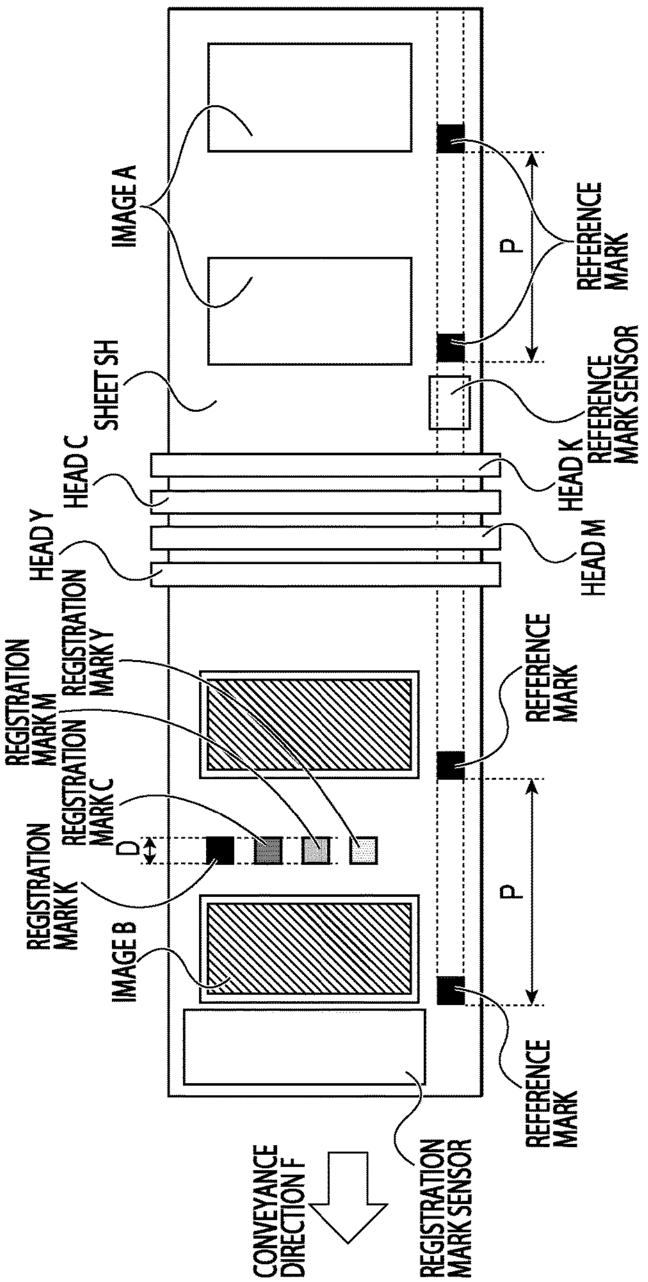

FIG. 1A and FIG. 1B are each a top diagram showing the arrangement of each mark printed on a sheet SH in a case where registration correction is performed in additional printing. Here, explanation is given by taking a full-color printing apparatus as an example, which uses four line print heads (head C, head M, head Y, head K) corresponding to each color of cyan, magenta, yellow, and black. It is assumed that for the long sheet conveyed toward a conveyance direction F, a sensor detecting test marks corresponding to each of CMYK for registration correction and a sensor detecting reference marks for additional printing are arranged in opposition to each other inside of the printing apparatus.

First, "additional printing" is explained. The long sheet wound into the shape of a roll used for additional printing is also called "roll sheet" or "continuous sheet (in the following, described as "sheet SH"). Here, on the sheet SH, reference marks and images A are printed in advance. Then, the reference marks formed on the sheet SH that is conveyed are detected by the reference mark sensor and based on the reference mark detection timing information, printing is performed on the sheet by the four line print heads so that images B are formed at desired positions.

Next, "registration correction" is explained. Here, the four line print heads include the black head K, the cyan head C, the magenta head M, and the yellow head Y. In the registration correction, the test mark corresponding to each color plane formed on the sheet SH is detected by a dedicated sensor and the shift in the image formation position (dot formation position) between the heads is corrected. In this case, in order to prevent the dedicated sensor from erroneously detecting the reference mark, the test mark is printed so that a range B in the width direction of the test mark does not overlap a range A in the width direction of the reference mark. In the following, the test mark corresponding to each color plane for registration correction is described as "registration mark", the dedicated sensor is described as "registration sensor", and the registration correction is described as "color registration correction".

As described above, in the range A in the width direction of the sheet SH, the reference mark is printed and in the range B, the registration mark is printed, respectively, and therefore, the area of a remaining range C is the area in which the printing-target images A and B can be formed (in the following, called "printable area"). In a case where the printable area becomes small because of the necessity to secure the area for forming the reference mark and the registration mark, the printing area and the printing amount per unit time are reduced, and therefore, the productivity is reduced considerably. Here, there is also a method of not reducing the printable area in the width direction by printing the registration mark for color registration correction between images arranged side by side in the conveyance direction as shown in FIG. 1B. However, with this method, it is no longer possible to print a printing-target image in a range D in the sheet conveyance direction, and therefore, the printable area is reduced in the sheet conveyance direction.

In order to solve the above-described problem, an object of the present disclosure is to secure a wider printable area in a case where color registration correction is performed in additional printing.

First Embodiment

Figure 2:
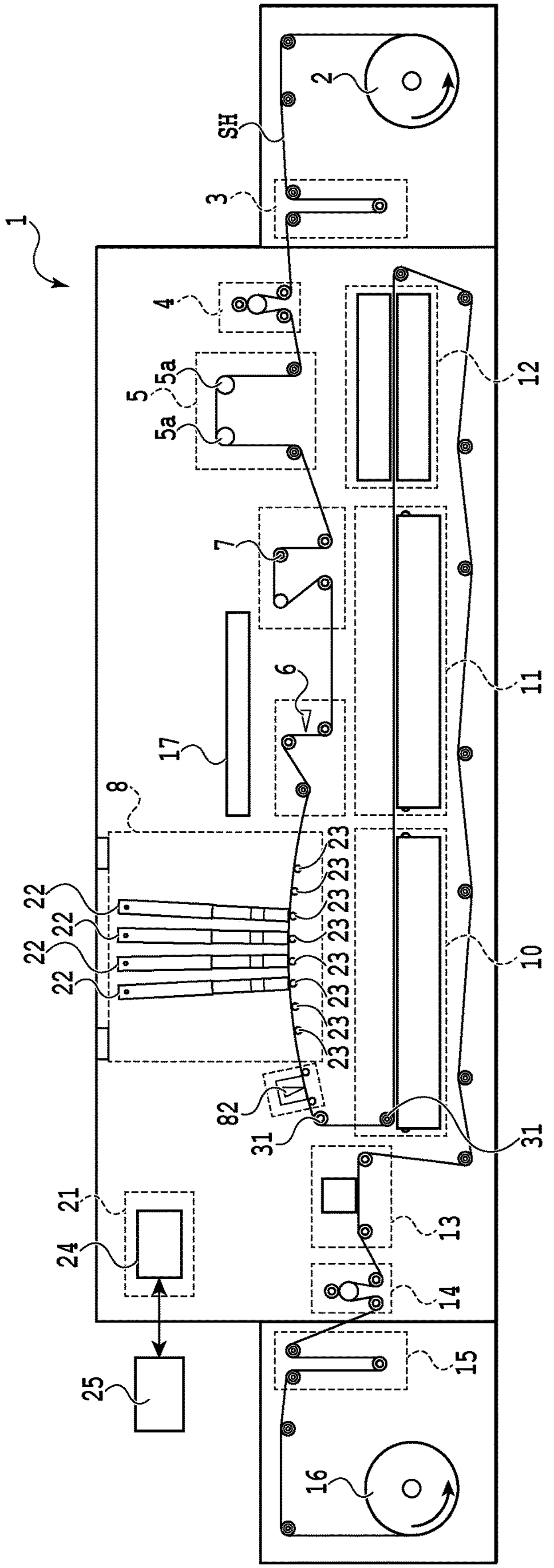
FIG. 2 is a schematic cross-sectional diagram showing an internal structure of a high-speed line printer.

FIG. 2 is a schematic cross-sectional diagram showing the internal structure of a high-speed line printer, as a printing apparatus 1 according to the present embodiment, using a continuous long sheet wound into the shape of a roll. In FIG. 2, the portion above the printing apparatus 1 is defined as "upper portion" and the short-side direction (direction from the front to the rear) of the long sheet, which is perpendicular to the sheet conveyance direction, is defined as "sheet width direction". The printing apparatus 1 comprises an unwinding roll unit 2, a first dancer unit 3, a first main conveyance unit 4, a meander correction unit 5, a reference mark sensor 6, a tensile force detection unit 7, an image formation unit 8, and a registration mark sensor 82. Further, the printing apparatus 1 comprises a first drying unit 10, a second drying unit 11, a cooling unit 12, a second scanner unit 13, a second main conveyance unit 14, a second dancer unit 15, a winding roll unit 16, and a maintenance unit 17. The sheet SH is conveyed along the conveyance path indicated by a solid line in FIG. 2 and processing is performed in each unit.

The unwinding roll unit 2 holds and supplies the sheet SH. The unwinding roll unit 2 has a configuration in which an unwinding roll is accommodated and the sheet SH is pulled out and supplied. The number of rolls that can be accommodated is not limited to one and a configuration may be accepted in which two, three, or more rolls are accommodated and the sheet SH is pulled out alternatively and suppled. The first dancer unit 3 is a unit for appending a predetermined sheet tensile force between the unwinding roll unit 2 and the first main conveyance unit 4. To the first dancer unit 3, a sheet tensile force is appended by a tensile force appending unit, not shown schematically. The first main conveyance unit 4 sends the sheet SH into the meander correction unit 5, the tensile force detection unit 7, the reference mark sensor 6, the image formation unit 8, the registration mark sensor 82, the first drying unit 10, the second drying unit 11, the cooling unit 12, and the second scanner unit 13 arranged in this order along the conveyance path. Further, the first main conveyance unit 4 rotates by driving a motor not shown schematically while appending a sheet tensile force between the second main conveyance unit 14 and itself and performs tensile force conveyance of the sheet SH. The meander correction unit 5 corrects the meander in the sheet width direction at the time of tensile force conveyance of the sheet SH. The meander correction unit 5 has a configuration comprising a meander correction roller 5*a* and a meander detection sensor, not shown schematically, which detects the meander of the sheet SH. The meander correction roller 5*a* performs the meander correction of the sheet SH by changing the inclination with the sheet SH by a motor not shown schematically based on the measurement by the meander detection sensor. At this time, by the sheet SH wrapping around the meander correction roller 5*a*, it is possible to improve the function of the meander correction.

The tensile force detection unit 7 is a unit for detecting a tensile force in a case where tensile force conveyance is performed between the first main conveyance unit 4 and the second main conveyance unit 14. The reference mark sensor 6 is a first mark detection unit configured to detect the mark (reference mark) indicating the reference position printed in advance at the end portion of the sheet SH, which is for the image formation unit 8 to control the printing start timing of each color plane. Further, the registration mark sensor 82 is a second mark detection unit configured to detect the registration mark of each ink color, which is printed at the end portion of the sheet SH by the image formation unit 8 for performing color registration correction. Each of the reference mark sensor 6 and the registration mark sensor 82 is provided on the conveyance path and the reference mark sensor 6 is arranged on the upstream side of the image formation unit 8 and the registration mark sensor 82 is arranged on the downstream side of the image formation unit 8, respectively. Further, the reference mark sensor 6 and the registration mark sensor 82 of the present embodiment are provided at the positions at which their detection ranges overlap (in a specific example to be described later, at the same position in the sheet width direction).

Figure 3:
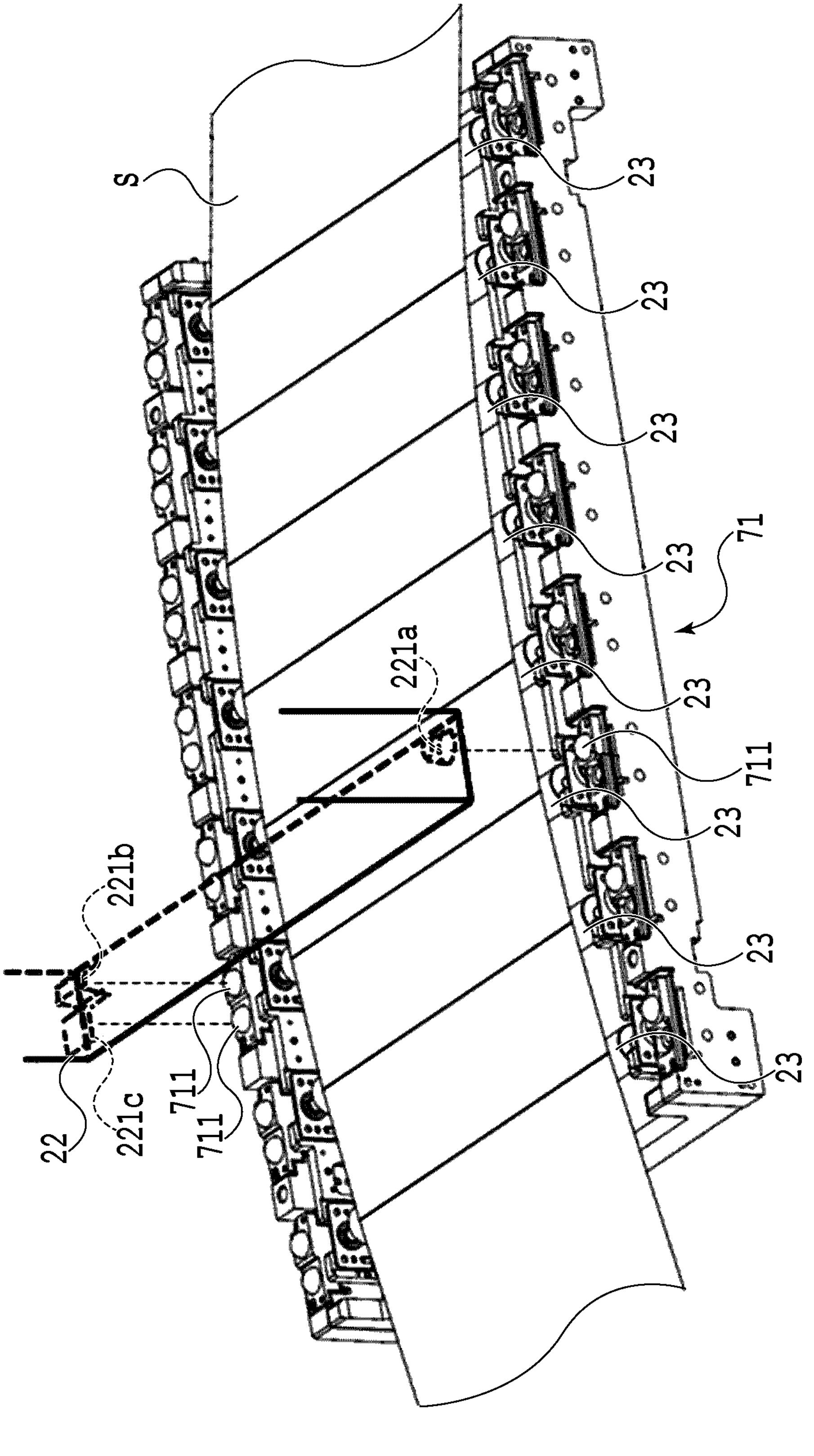
FIG. 3 is a perspective diagram of a sheet conveyance unit casing.
Figure 4:
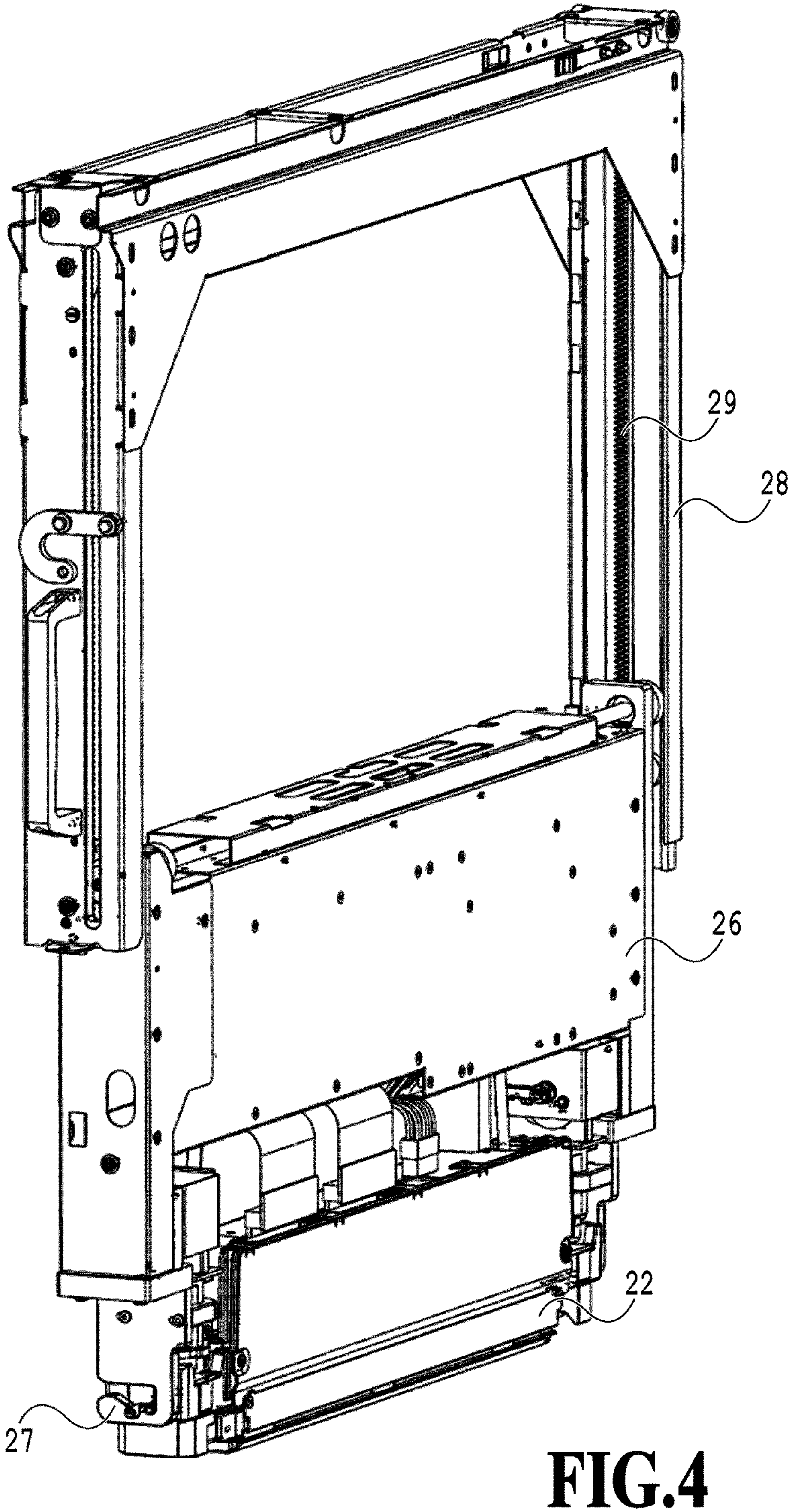
FIG. 4 is a perspective diagram of a print head elevating and lowering mechanism.

The image formation unit 8 includes line heads 22 of each ink color, which perform printing for each color plane by the ink jet method from above the sheet SH that is conveyed. The conveyance path in the image formation unit 8 is formed by guide rollers 23 arranged in the shape of an arc convex upward and by a predetermined tensile force being appended to the sheet SH, a clearance is secured between the sheet SH and the line heads 22. As the line heads 22, four line heads 22K, 22Y, 22M, and 22C exist, which are arranged side by side along the conveyance direction and correspond to the four colors of Bk (black), Y (yellow), M (magenta), and C (cyan) in the present embodiment. That is, in a case where the number of color planes is M, the M line heads 22 are arranged side by side in the conveyance direction. The number of color planes (number of line heads 22) is not limited to four as described above. Further, as the ink jet method, it is possible to adopt the method using a heating element, the method using a piezo element, the method using an electrostatic element, the method using a MEMS element and the like. The ink of each color is supplied to the line head 22 via an ink tube from each ink tank, not shown schematically. Further, as shown in FIG. 3, a sheet conveyance unit casing 71 of the image formation unit 8 is provided with a plurality of positioning members 711 for positioning the line head. For the one line head 22, the three positioning members 711 are provided so that one is located on the front side and two are located on the rear side in the sheet width direction with the sheet SH being sandwiched in between. Further, as shown in FIG. 4, the line head 22 is supported pivotally by a head holding unit 26 for holding and lifting and lowing the line head 22 so as to support a head support axis 27 from under. The head holding unit 26 performs vertical lifting and lowering operation along rails 29 for lifting and lowering provided within a line head lifting and lowering frame 28 by a driving mechanism, not shown schematically, provided inside of the head holding unit 26. The first drying unit 10 and the second drying unit 11 reduce the amount of liquid included in the ink ejected onto the sheet SH and improve fixability between the sheet SH and the ink. The second drying unit 11 is arranged on the downstream side in the sheet conveyance direction of the first drying unit 10. The first drying unit 10 and the second drying unit 11 heat the sheet SH to which ink has been appended and dry the appended ink. Inside of the first drying unit 10 and the second drying unit 11, hot air is appended to the passing sheet SH at least from the surface side onto which ink has been appended and the ink-appended surface of the sheet SH is dried. As the drying method, in addition to the method of appending hot air, it may also be possible to configure a method by combining the method of irradiating the sheet SH surface with electromagnetic waves (ultraviolet rays, infrared rays and the like) and the conduction heat transfer method by contact of a heating body. A wrapping guide roller 31 is a roller that wraps the side opposite to the side, onto which ink has been appended of the sheet SH on the downstream side of the image formation unit 8, with a predetermined wrapping angle because it is necessary to prevent vibrations due to the hot air of the first drying unit 10 from being transmitted to the image formation unit 8. In this example, the two wrapping guide rollers 31 are arranged between the registration mark sensor 82 and the first drying unit 10 and the sheet SH is folded back substantially in parallel at the upper and lower portions of the apparatus. The first drying unit 10 is arranged under the image formation unit 8 in the apparatus and the second drying unit 11 is arranged under the reference mark sensor 6 described previously in the apparatus. The cooling unit 12 suppresses the amount of change in temperature of the sheet SH in the process on the downstream side of the printing apparatus 1 as well as cooling the sheet SH fixed in the first drying unit 10 and the second drying unit 11 and solidifying the softened ink. Inside of the cooling unit 12, low-temperature air is appended at least from the ink-appended surface side to the passing sheet SH and the ink-appended surface of the sheet SH is cooled. The cooling method is not limited to the method of appending air and the conduction heat transfer method by contact of a heat dissipation member may be accepted or it may also be possible to configure a method by combining those methods.

The second main conveyance unit 14 conveys a sheet while appending a tensile force to the first main conveyance unit 4 and the sheet SH and adjusts the tensile force of the sheet SH. The second main conveyance unit 14 rotates by being driven by a motor not shown schematically and adjusts the tensile force of the sheet SH by a clutch (not shown schematically) capable of controlling the coupled torque in accordance with the tensile force value detected by the tensile force detection unit 7 from a tensile force control unit, not shown schematically. As an additional configuration for adjusting the tensile force of the sheet SH, a configuration may be added in which the speed of the second main conveyance unit 14 is controlled by the tensile force detection unit 7. As the tensile force control method in this case, it is possible to have two methods, that is, the torque control method of controlling the torque value transmitted from the clutch and the speed control method of controlling the speed of the roller of the second main conveyance unit 14, and switch the tensile force control methods in accordance with the purpose or use both the methods at the same time. The second dancer unit 15 appends a predetermined sheet tensile force between the second main conveyance unit 14 and the winding roll unit 16. The winding roll unit 16 winds the sheet HS for which print processing has been performed around a winding core. The number of rolls capable of collecting the sheet SH is not limited to one and a configuration may be accepted in which the sheet SH is collected by alternatively switching between two or more winding cores. Depending on the modification processing contents after printing, a configuration in which the sheet SH is cut by using a cutter and stacked may be adopted in place of the configuration in which the sheet SH is wound around the winding core.

A control unit 21 comprises the calculation device, such as CPU, and the storage device, such as a memory (RAM and ROM) and HDD, and comprehensively controls each of the above-described units by the calculation device executing programs stored in the storage device, and thereby, implements the operation flow to be described later. Further, the control unit 21 has an external interface and an operation unit on which a user performs input and output. The operation of the printing apparatus 1 is controlled based on instructions from a host apparatus 25, such as a host computer, connected via the control unit 21 or the external interface. The maintenance unit 17 has a cap mechanism protecting the ink ejection surface of the line head 22, a wiper mechanism wiping the ink ejection surface, and a suction mechanism sucking in under negative pressure the ink within the line head 22 from the ink ejection surface and maintains the performance of the line head 22.

In the present disclosure, explanation is given by taking an ink jet printing apparatus as an example, but the method of forming an image is not limited to the ink jet method and for example, it is also possible to apply the present disclosure to an electrophotographic printing apparatus.

<Operation Flow of Printing Apparatus 1>

Figure 5:
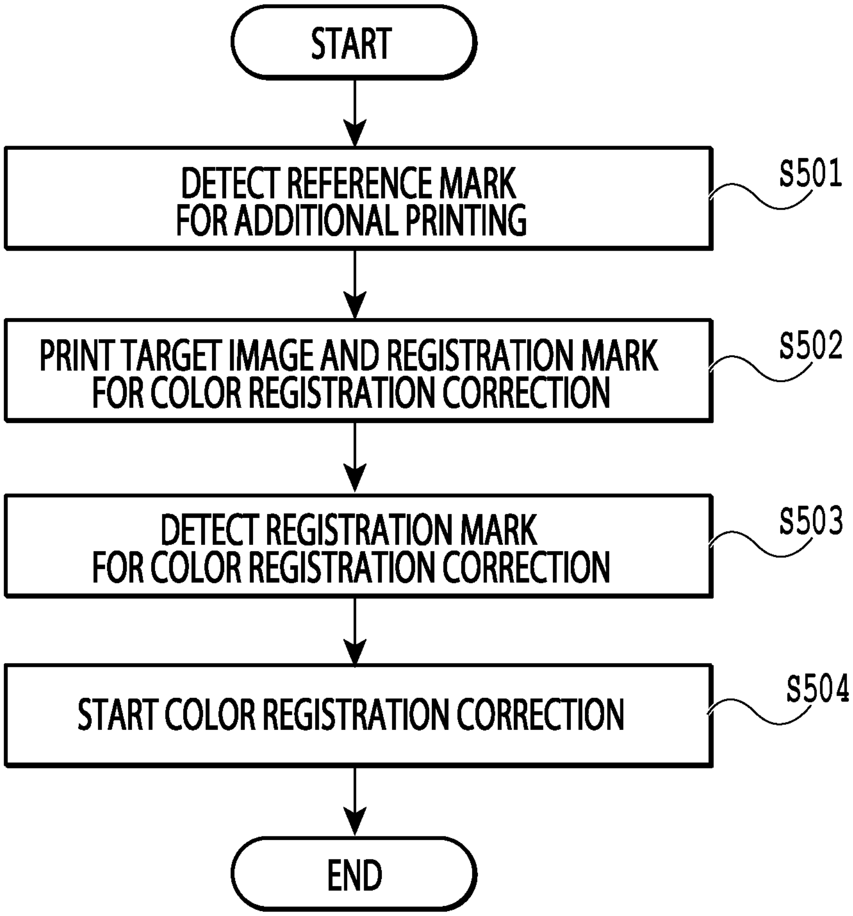
FIG. 5 is a flowchart showing the operation of a printing apparatus.

FIG. 5 is a flowchart showing a rough flow in a case where color registration correction is performed in additional printing. In the following explanation, a symbol "S" means a step.

At S501, based on the instructions of the control unit 21, the reference mark sensor 6 performs detection processing of a reference mark for additional printing, which is printed in advance on the sheet SH that is conveyed. The reference mark sensor 6 detects the reference mark by the difference in density between the sheet SH that is conveyed and the reference mark by using, for example, a contrast sensor detecting a change in density of an object. However, the reference mark sensor 6 is required only to be capable of detecting the reference mark and the sensor that is used for the detection processing at this step is not limited to the contrast sensor. Further, in many cases the color of the reference mark is black and in the present embodiment also, explanation is given by assuming that the color of the reference mark is black, but the color of the reference mark is not limited to black.

At S502, based on the instructions of the control unit 21, the image formation unit 8 forms the target second image by performing printing for the sheet SH that is conveyed by superimposing each color plane at the image formation position indicated by the reference mark detected at S501. Further, the image formation unit 8 arranges the registration marks of each color plane (of each ink color) side by side between the adjacent reference marks detected at S501 so that the registration marks do not overlap in the sheet conveyance direction and performs printing at the same position in the sheet width direction. In the present embodiment, the registration mark of black, which is the reference color, and the registration marks of cyan, magenta, and yellow, which are non-reference colors, are formed between adjacent reference marks.

At S503, based on the instructions of the control unit 21, the registration mark sensor 82 performs processing to detect the registration mark corresponding to each color plane printed on the sheet SH that is conveyed. In this detection processing, calculation of relative shift amounts (positional shift amounts) $\Delta Xc-k$, $\Delta Xm-k$, and $\Delta Xy-k$ is also performed, which represent the differences between each position of the registration marks of cyan, magenta, and yellow, which are non-reference colors, and the position of the registration mark of black, which is the reference color. Here, the reference mark and the registration mark corresponding to each color plane are printed at the positions at least part of which overlap in the sheet width direction and both the marks pass directly under the registration mark sensor 82, and therefore, the registration mark sensor 82 also detects the reference mark. Consequently, in the detection processing at this step, in a case where the color other than the reference color (here, color other than black) is detected, control is performed so that the operation mode of the registration mark sensor 82 moves from the non-detection mode to the detection mode. Then, the registration marks are recognized as the registration mark of each ink color in the order of detection in the detection mode. In the present embodiment, the first registration mark is detected as the registration mark of cyan, the second registration mark as the registration mark of black, the third registration mark as the registration mark of magenta, and the fourth registration mark as the registration mark of yellow. Then, after the detection of the fourth registration mark, the operation mode of the registration mark sensor 82 is returned to the non-detection mode from the detection mode. By performing control so that the operation mode is moved to the detection mode in a case where the mark of color different from the reference color is detected in this manner, the erroneous detection of the reference mark is prevented.

At S504, the color registration correction is started by the control unit 21. That is, processing is started, which adjusts the printing start timing in a case where each color plane is printed in accordance with the position of the reference mark on the sheet SH based on the positional shift amount of each color plane, which is obtained at S503. In the actual color registration correction, not only the positional shift in the sheet conveyance direction but also the positional shift in the sheet width direction is corrected, but this does not relate to the present disclosure, and therefore, explanation is omitted. Then, after this step, until all the second images relating to the input printing instructions data are formed on the sheet SH, each piece of processing of the detection of the reference mark, the printing of the target image and the registration mark, and the detection of the registration mark is repeated.

The above is a rough flow of the operation in the printing apparatus 1 in a case where color registration correction is performed in additional printing. With the method of the present embodiment, by printing the reference mark and the registration mark at the same position in the width direction while shifting the position in the conveyance direction of the sheet SH, it is made possible to secure the printable area larger than that by the conventional method shown in FIG. 1. In the following, how the processing at each step progresses specifically is explained in detail by using the drawings.

<Detection Processing of Reference Mark (S501)>

Figure 6:
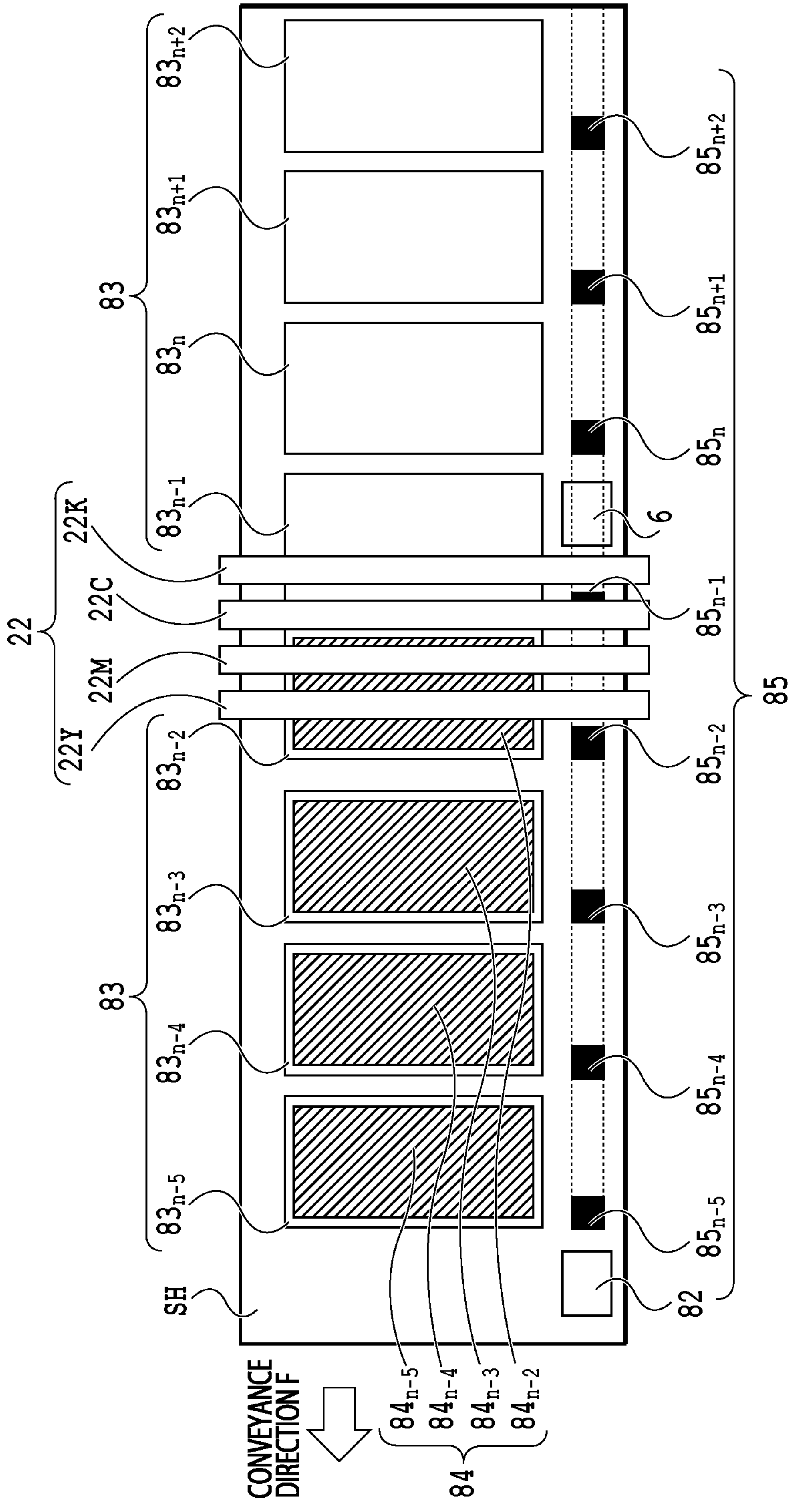
FIG. 6 is a top diagram showing the state of a sheet during execution of additional printing.

FIG. 6 is a top diagram showing the state of the sheet SH during execution of additional printing. Here, on the sheet SH, a first image 83 and a reference mark 85 are printed in advance and the reference mark sensor 6 sequentially detects the reference mark 85 on the sheet SH that is conveyed. Then, each time the reference mark 85 is detected, based on the detection timing thereof, for the first image 83 printed in advance, a second image 84 is printed by the four line heads 22 at an appropriate position. For example, in a case where a reference mark $\mathbf{85}_{n-5}$ is detected, a second image $\mathbf{84}_{n-5}$ is printed so as to overlap a first image $\mathbf{83}_{n-5}$ at the center. Here, the reference mark $\mathbf{85}_{n-5}$ and reference marks $\mathbf{85}_{n-4}$, $\mathbf{85}_{n-3}$, and $\mathbf{85}_{n-2}$ in FIG. 6 are in the state where the detection processing by the reference mark sensor 6 and the print processing by the four line heads 22 have been performed. That is, they are in the state where the reference marks have already been detected and the formation of the second image $\mathbf{84}_{n-5}$ and second images $\mathbf{84}_{n-4}$, $\mathbf{84}_{n-3}$, and $\mathbf{84}_{n-2}$ at appropriate positions for the first image $\mathbf{83}_{n-5}$ and first images $\mathbf{83}_{n-4}$, $\mathbf{83}_{n-3}$, and $\mathbf{83}_{n-2}$ has been completed. Then, a reference mark $\mathbf{85}_{n-1}$ is in the state where detection has already been completed, but the formation of the second image 84 has not been performed yet. Then, reference marks $\mathbf{85}_{n}$, $\mathbf{85}_{n+1}$, and $\mathbf{85}_{n+2}$ are in the state of being not detected yet (as a matter of course, the formation of the second image 84 is not performed yet).

Here, explanation is given on the assumption that the first image 83 is printed in advance on the sheet SH by another printing apparatus or the like, but this is not limited. For example, the configuration may be one in which in the printing apparatus 1 comprising the two image formation units 8, by the image formation unit 8 in the previous stage, the first image 83 is printed and following this, by the image formation unit 8 in the post stage, the second image 84 is printed.

<Print Processing of Target Image and Registration Mark (S502)>

Figure 7:
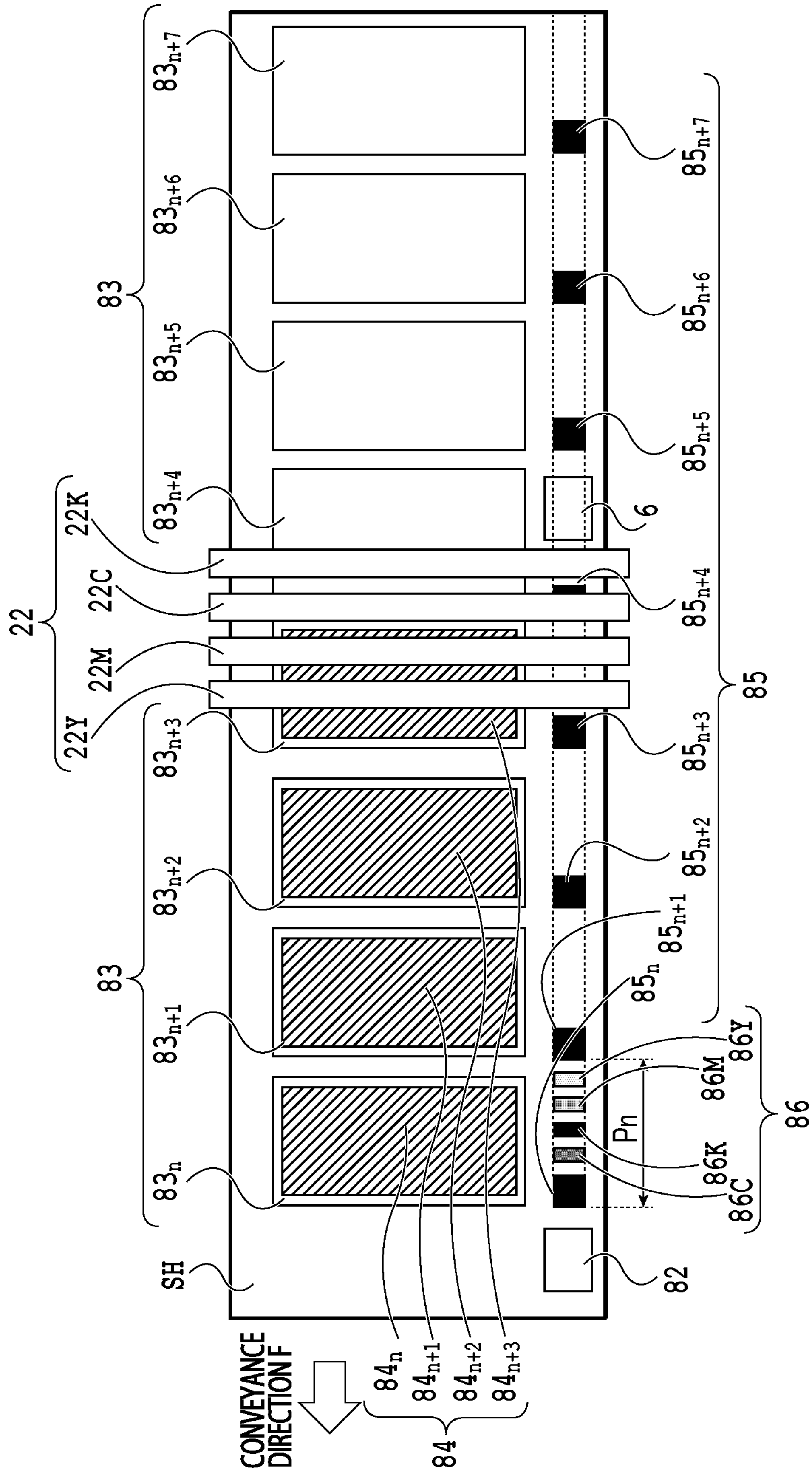
FIG. 7 is a top diagram showing the state where a registration mark is printed after a predetermined time elapses from the state in FIG. 6.

FIG. 7 shows the state where registration marks are printed after a predetermined time elapses from the state in FIG. 6 described above and the printing order is a registration mark 86C of cyan, a registration mark 86K of black, a registration mark 86M of magenta, and a registration mark 86Y of yellow. Here, based on the detected reference marks $85_n$, $85_{n+1}$, and $85_{n+2}$ and a detected reference mark $85_{n+3}$, second images $84_n$, $84_{n+1}$, $84_{n+2}$, and $84_{n+3}$ are formed at each appropriate position for first images $83_n$, $83_{n+1}$, $83_{n+2}$, and $83_{n+3}$. Further, between the reference mark $85_n$ and the reference mark $85_{n+1}$, at the same position as that of the reference mark 85 in the sheet width direction, the registration marks 86C, 86K, 86M, and 86Y are formed. These registration marks 86C, 86K, 86M, and 86Y are printed on the sheet SH with the detection timing of the reference mark $85_n$ by the reference mark sensor 6 as a reference. The printing order in this case is cyan, black, magenta, and yellow. Here, the first color is cyan among the colors other than black, which is the color of the reference mark 85, but the first color may be magenta or yellow.

<Detection Processing of Registration Mark (S503)>

The registration marks 86C, 86K, 86M, and 86Y of each ink color, which are printed on the sheet SH, are detected by the registration mark sensor 82 arranged on the downstream side of the line head 22 (see FIG. 2 described previously). In that case, calculation of the positional shift amounts ΔXc−k, ΔXm−k, and ΔXy−k relative to the registration mark 86K of black of each of the color registration marks 86C, 86M, and 86Y other than black is also performed.

<Determination/Detection of Registration Mark>

Figure 8:
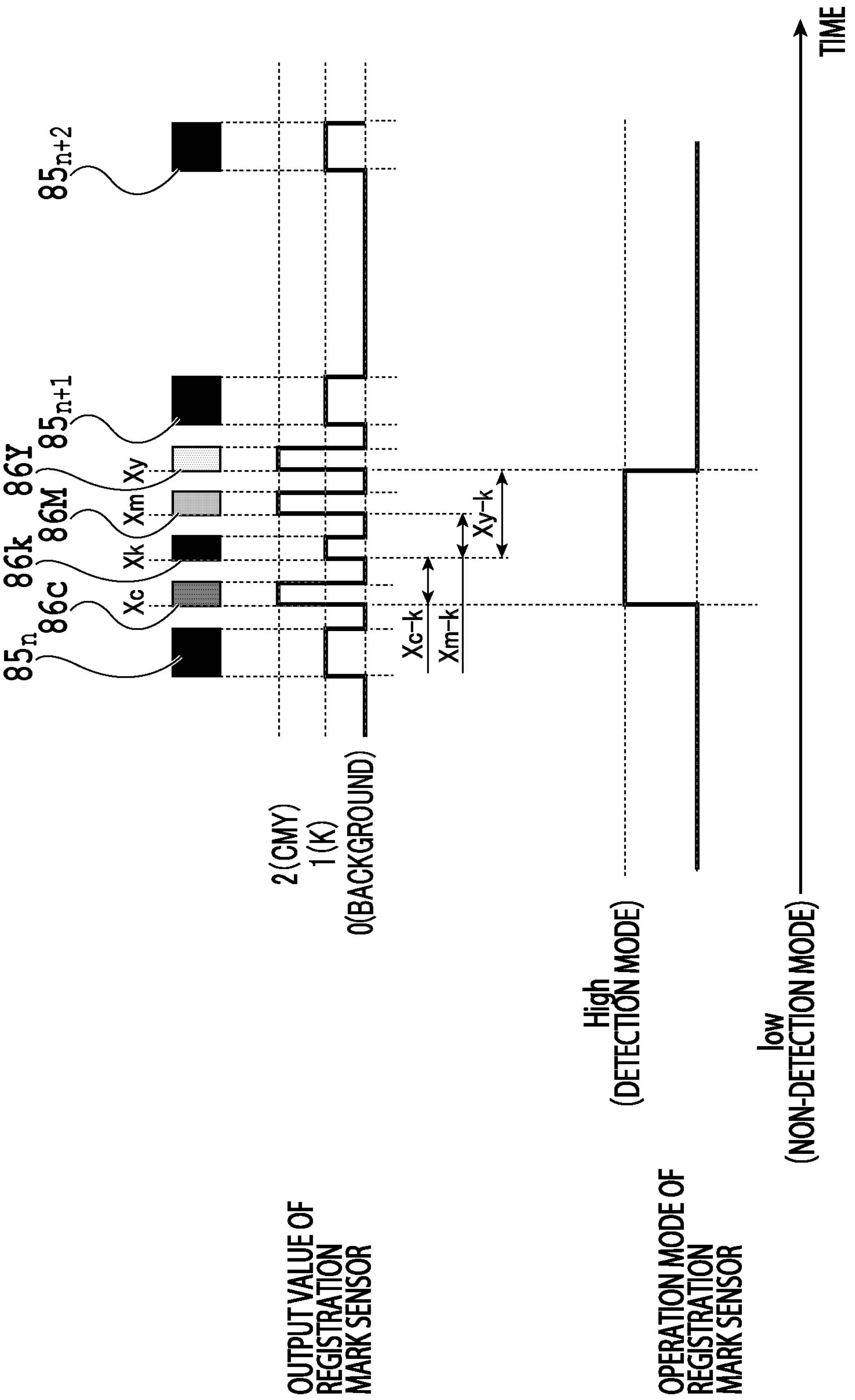
FIG. 8 is a timing chart showing a transition of operation modes of a registration mark sensor and results of detection of a registration mark of each ink color.

As described previously, the registration mark 86 and the reference mark 85 are formed at the positions at least part of which overlap in the sheet width direction (in the present embodiment, the same position in the sheet width direction). Consequently, a method of determining and detecting the registration mark 86 without erroneous detection is explained. FIG. 8 is a timing chart showing a transition of the operation mode of the registration mark sensor 82 and detection results of the registration marks 86C, 86K, 86M, and 86Y of each ink color. The registration mark sensor 82 detects each registration mark by the difference between the density of the non-mark portion (background) on the sheet SH and the density of the mark portion. Then, the registration mark sensor 82 outputs an output value of "0" in a case of reading the background of the sheet SH, an output value of "1" in a case of reading the registration mark 86K of black, and an output value of "2" in a case of reading each of the registration mark 86C of cyan, the registration mark 86M of magenta, and the registration mark 86Y of yellow, respectively. Here, the reference mark 85 is not the target of the detection processing at this step. However, the reference mark 85 and the registration mark 86 are each printed at the same position in the sheet width direction and the reference mark 85 also passes directly under the registration mark sensor 82, and therefore, the reference mark 85 is also read by the registration mark sensor 82. At this time, it is necessary to determine whether the read mark is the reference mark 85 or the registration mark 86 and in the present embodiment, this is dealt with by controlling the operation mode of the registration mark sensor 82. That is, as shown in FIG. 8, the mode control is performed in which the initial operation mode of the registration mark sensor 82 is set to "non-detection mode" at first and in a case where the registration mark sensor 82 reads the registration mark 86 (here, 86C) of the color other than black, "non-detection mode" is switched to "detection mode". Then, it is assumed that all the marks read in the detection mode are handled as the registration mark 86. Here, the order in which the registration mark is read (detected) after the setting of the operation mode is changed to the detection mode is the registration mark 86C of cyan, the registration mark 86K of black, the registration mark 86 M of magenta, and the registration mark 86Y of yellow. Then, at the point in time at which the four registration marks are detected, the operation mode of the registration mark sensor 82 is returned to "non-detection mode". After that, in a case where the mark of the color other than black is detected again by the registration mark sensor 82, the operation mode changes to "detection mode" again and after the detection of the four registration marks is completed, the operation mode is returned to "non-detection mode" again.

<<Calculation of Positional Shift Amount>>

Following the above, calculation of the positional shift amount of each of the registration marks 86C, 86M, and 86Y other than black with respect to the registration mark 86K of black is explained. Here, the positions on the sheet SH at timing at which the front ends of the registration mark 86C, the registration mark 86K, the registration mark 86M, and the registration mark 86Y are detected are taken to be detection positions Xc, Xk, Xm, and Xy, respectively. Further, the interval between the detection position Xc of the registration mark 86C and the detection position Xk of the registration mark 86K is taken to be Xc-k. Similarly, the interval between the detection position Xm of the registration mark 86M and the detection position Xk of the registration mark 86K is taken to be Xm-k and the interval between the detection position Xy of the registration mark 86Y and the detection position Xk of the registration mark 86K is taken to be Xy-k. Then, the differences between each of the mark intervals Xc-k, Xm-k, and Xy-k and each of ideal mark intervals (ideal intervals) $Xid_{c-k}$, $Xid_{m-k}$, and $Xid_{y-k}$ are found respectively. Here, an ideal interval Xid in a case where each registration mark is formed in the order shown in FIG. 7 is such that $Xid_{c-k}$ and $Xid_{m-k}$ are equal and $Xid_{y-k}$ is twice $Xid_{c-k}$ and $Xid_{m-k}$. Due to this, the positional shift amounts ΔXc-k, ΔXm-k, and ΔXy-k with respect to the registration mark 86K of black are obtained for each of the registration marks 86C, 86M, and 86Y other than black. The positional shift amounts ΔXc-k, ΔXm-k, and ΔXy-k with respect to the registration mark 86K of black in this case are expressed by formula (1) to formula (3) below, respectively.

$$\Delta Xc-k = Xc-k-Xid_{c-k} \quad \text{formula (1)}$$

$$\Delta Xm-k = Xm-k-Xid_{m-k} \quad \text{formula (2)}$$

$$\Delta Xy-k = Xy-k-Xid_{y-k}. \quad \text{formula (3)}$$

By formulas (1) to (3) described above, values such as 0.01 mm to 0.1 mm are calculated as the positional shift amount. Further, in a case where the ideal interval Xid is shorter, the value is positive and in a case where the ideal interval Xid is longer, the value is negative. The detection positions Xc, Xk, Xm, and Xy of the registration marks 86 may be the positions at the timing at which the rear end of each corresponding registration mark is detected. Alternatively, the intermediate position that is found from the timing at which the front end of each registration mark is detected and the timing at which the rear end is detected may be taken to be each of the detection positions Xc, Xk, Xm, and Xy.

<Color Registration Correction (S504)>

Figure 9B:
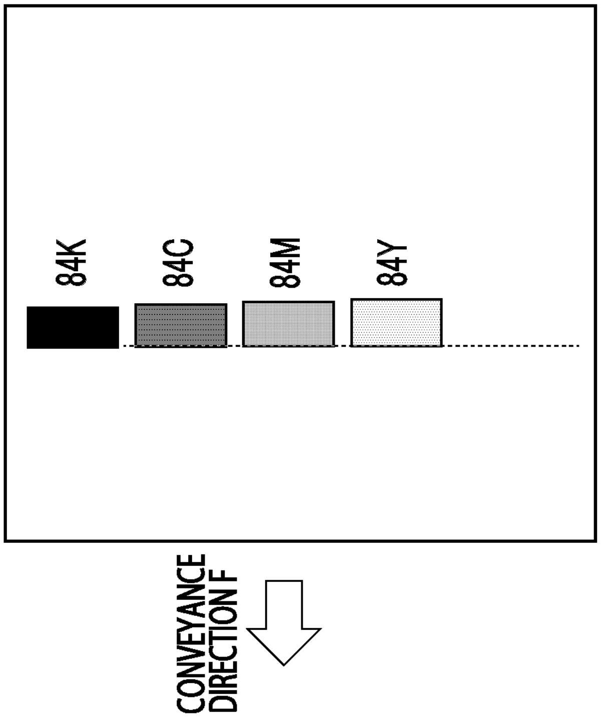
FIG. 9A is a top diagram showing a printing position of each color plane before color registration correction and FIG. 9B is a top diagram showing a printing position of each color plane after color registration correction.
Figure 9A:
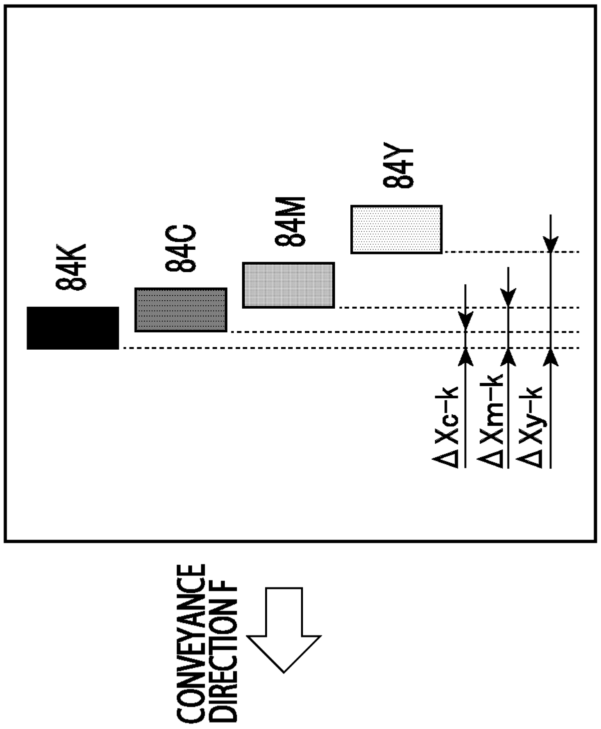

FIG. 9A is a top diagram showing the printing position of each color plane before color registration correction and FIG. 9B is a top diagram showing the printing position of each color plane after color registration correction. FIG. 9A shows each of color planes 84K, 84C, 84M, and 84Y printed by each of the line heads 22Y, 22M, 22C, and 22K with the same position designated respectively as the image formation position. Here, as shown in FIG. 9A, before the color registration correction, the color planes of other than black are shifted in the opposite direction of the conveyance direction F by ΔXc-k, ΔXm-k, and ΔXy-k (each positive value), respectively, with respect to the color plane of black. In contrast to this, the positions of each of the color planes 84K, 84C, 84M, and 84Y in FIG. 9*a* are aligned because the printing start timing of all the color planes is adjusted by the color registration correction. In this example, as regards the color plane of cyan, the positional shift from the color plane of black is resolved by advancing the printing start timing by the line head 22C by the time required for the sheet SH to advance ΔXc-k at a predetermined conveyance speed (for example, 300 mm/sec). As regards the color planes of magenta and yellow similarly, the positional shift from the color plane of black is resolved by starting printing at timing earlier by the time required for the sheet SH to advance ΔXm-k or ΔXy-k respectively. In a case where the values of Axc-k, ΔXm-k, and ΔXy-k are negative (in a case where each of the mark intervals Xc-k, Xm-k, and Xy-k is shorter than the ideal interval Xid), it is sufficient to delay the printing start timing accordingly. In the color registration correction in which the printing start timing of each color plane is adjusted based on the positional shift amount calculated for each registration mark of each color, there is a time lag between the calculation of the positional shift amount and the adjustment of the printing start timing. For example, in the example in FIG. 7 described previously, the adjustment of the printing start timing based on the positional shift amount calculated for the second image 84*n* is performed from a first image $\mathbf{83}_{n+6}$ or $\mathbf{83}_{n+7}$. As described above, by adjusting the printing start timing of each color plane based on the positional shift amount obtained by the detection processing at S503, the color planes of cyan, magenta, and yellow are aligned with the color plane of black, and therefore, it is made possible to resolve the shift in the printing position between color planes.

Modification Example 1

In the embodiment described above, by performing the mode control to switch the non-detection mode to the detection mode in a case where the registration mark sensor 82 detects a color other than the reference color, the reference mark that is formed at the same position in the sheet conveyance direction is prevented from being detected erroneously as the registration mark. The method of preventing erroneous detection is not limited to this. In the following, two registration mark determination methods for preventing erroneous detection are explained.

<<Determination Based on Mark Interval>>

Figures 10A, 10B:
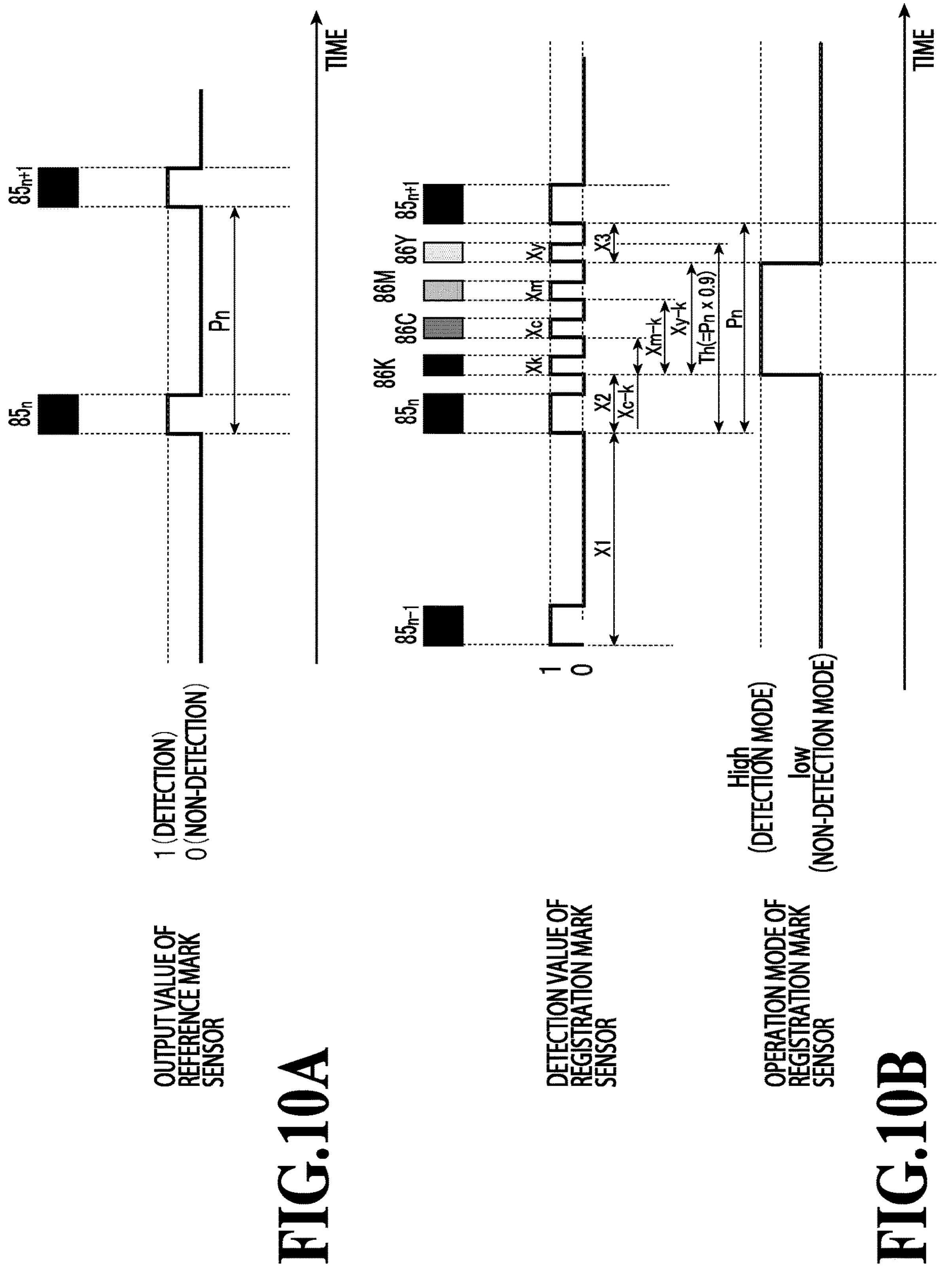
FIG. 10A is a timing chart showing a change in the output value of a reference mark sensor and FIG. 10B is a timing chart showing a change in the output value in the registration mark sensor and a change in the state of the operation mode of the registration mark sensor.

The first method is a method in which a threshold value is provided for the interval between marks and in a case where the interval from the one previous mark is less than or equal to the threshold value, the detected mark is determined to be the registration mark. As the threshold value in this case, a time is used that is shorter than the time interval in a case where two reference marks (reference mark, and reference mark $_{n+1}$) adjacent to each other in the conveyance direction F are detected. As shown in FIG. 6 and FIG. 7 described previously, for example, the registration mark is printed between two reference marks adjacent to each other. Consequently, in a case where the next mark is detected in a time interval shorter than the time interval at the time of detecting the two reference marks adjacent to each other, it is possible to determine that the mark relating to the detection is the registration mark. FIG. 10A is a timing chart showing the change in the output value of the reference mark sensor 6 in the present modification example. A time interval Pn at the timing at which the reference mark 85*n* and the reference mark $\mathbf{85}_{n+1}$ shown in FIG. 6 and FIG. 7 described previously is measured and, for example, a value obtained by multiplying the time interval Pn by 0.9 is set as a threshold value Th.

FIG. 10B is a timing chart showing the change in the output value in the registration mark sensor 82 and the change in the state of the operation mode of the registration mark sensor 82 according to the present modification example. In FIG. 10B, X1 to X3 each represent the time required from the timing at which the front end of the mark is detected by the registration mark sensor 82 to the timing at which the front end of the next mark is detected. Only in a case where the operation mode of the registration mark sensor 82 is "non-detection mode", the time interval between the front ends of the marks is measured and in a case of "detection mode", the time interval is not measured. The operation mode of the registration mark sensor 82 is "non-detection mode" in the initial state and in a case where the registration mark 86 is detected, the mode moves to "detection mode". Here, the time interval X1 from the detection of the reference mark $\mathbf{85}_{n-1}$ to the detection of the next reference mark $\mathbf{85}_{n}$ is longer than the threshold value Th (0.9×time interval Pn). Consequently, during this period of time, the operation mode is "non-detection mode". Then, the time interval X2 from the detection of the next reference mark $\mathbf{85}_{n}$ to the detection of the first registration mark 86K is less than or equal to the threshold value Th. Consequently, the operation mode of the registration mark sensor 82 at this time is "detection mode". Then, all the marks detected by the registration mark sensor 82 in "detection mode" are handled as the registration mark 86. In the example shown in FIG. 10B, in the order of detection, the first mark is recognized as the registration mark 86K of black, the second mark as the registration mark 86C of cyan, the third mark as the registration mark 86M of magenta, and the fourth mark as the registration mark 86Y of yellow. Then, in a case where the registration marks 86 corresponding to the number of color planes (here, four) are detected, the operation mode of the registration mark sensor 82 returns to "non-detection mode". Then, the time interval X3 from the detection of the registration mark 86Y to the detection of the reference mark $\mathbf{85}_{n+1}$ is shorter than the threshold value Th, but the mark is detected after the operation mode of the registration mark sensor 82 moves to "non-detection mode", and therefore, the mark is not recognized as the registration mark 86. Then, in a case where the detection interval becomes shorter than the threshold value for the marks detected after this, the operation mode of the registration mark sensor 82 makes a transition into "detection mode" again and in a case where the four registration marks 86 are detected, the operation mode returns to "non-detection mode". In a case of the above-described embodiment, it is necessary to make the color of the first registration mark different from the color of the reference mark, but in the present modification example, there are no restrictions on the color of the mark. Consequently, for example, it may also be possible to make the color of the first registration mark the same as the color of the reference mark (here, black). Further, in a case of the present modification example, it is not necessary to distinguish the colors of marks, and therefore, it is possible to adopt a sensor not having the color determination function as the registration mark sensor 82 and it is made possible to more simply determine the registration mark.

<<Determination Based on Mark Length>>

Figure 11A:
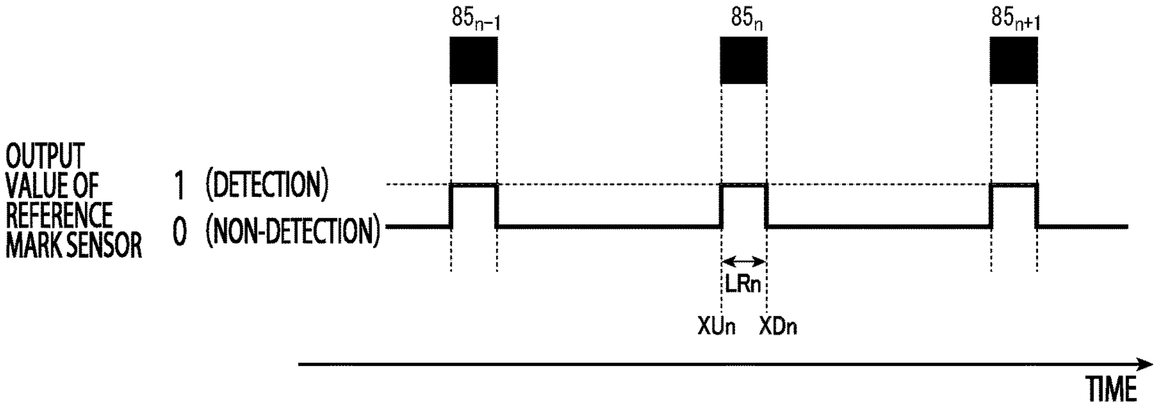
FIG. 11A is a timing chart showing detection timing of a reference mark by the reference mark sensor.
Figure 11B:
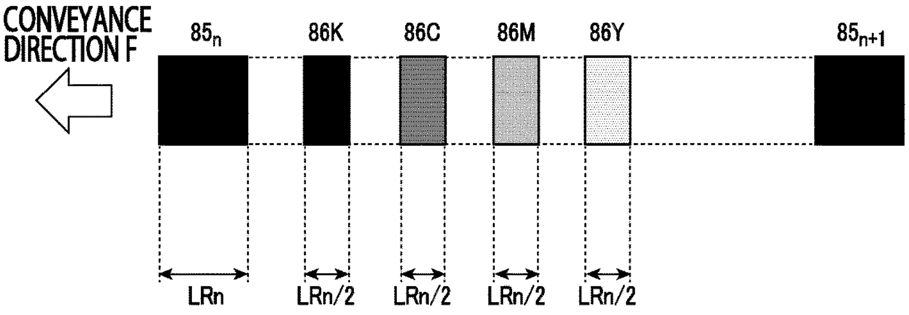
FIG. 11B is a sheet top diagram showing a printing position and size of each registration mark.
Figure 11C:
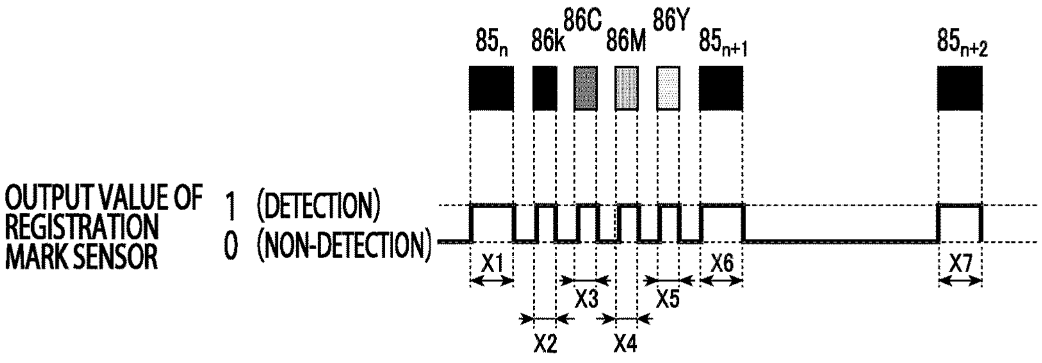
FIG. 11C is a timing chart showing detection timing of a registration mark by the registration mark sensor.

The second method is a method in which the length of the registration mark 86 in the conveyance direction is made different from that of the reference mark 85 and by measuring also the mark length in the detection processing of the registration mark 86, whether the detected mark is the registration mark 86 or the reference mark 85 is determined. FIG. 11A is a timing chart showing the detection timing of the reference mark 85 by the reference mark sensor 6 according to the present modification example. From the difference in time between detection timing XUn of the front end of the reference mark 85$_n$ and detection timing XDn of the rear end and the conveyance speed, a mark length LRn of the reference mark 85$_n$ is found. FIG. 11B is top diagram of the sheet SH and shows the printing positions and sizes of each of the registration marks 86K, 86C, 86M, and 86Y according to the present modification example. Here, the length of each of the registration marks 86K, 86C, 86M, and 86Y is set to LRn/2, which is half of the mark length LRn of the reference marks 85, and 85$_{n+1}$. Then, as in the modification example 1 described above, the color of the first registration mark is set to black, which is the same as the color of the reference mark, and each of the registration marks 86K, 86C, 86M, and 86Y is printed at the same position in the sheet conveyance direction of the reference mark 85$_n$ and between the reference mark 85$_n$ and the reference mark 85$_{n+1}$. FIG. 11C is a timing chart showing the detection timing of the registration mark 86 by the registration mark sensor 82 according to the present modification example. From the difference in time between the detection timing of the mark front end and the detection timing of the mark rear end and the conveyance speed, mark lengths X1 to X7 of the detected marks are found and in a case where the mark length is shorter than or equal to a predetermined length, the mark is handled as the registration mark 86. In FIG. 11C, each of the mark lengths X1, X6, and X7 in a case where the reference marks 85$_n$, 85$_{n+1}$, and 85$_{n+2}$ are detected is longer than or equal to the predetermined length, and therefore, the marks are not handled as the registration mark 86. In contrast to this, each of the mark lengths X2, X3, X4, and X5 in a case where the registration marks 86K, 86C, 86M, and 86Y are detected is longer than the predetermined length, and therefore, the marks are handled as the registration mark 86. Then, in the detection order, the first mark is recognized as the registration mark 86K of black, the second mark as the registration mark 86C of cyan, the third mark as the registration mark 86M of magenta, and the fourth mark as the registration mark 86Y of yellow. In a case of the present modification example also, there are no restrictions on the color of the mark, and therefore, it is possible to adopt a sensor not having the color determination function as the registration mark sensor 82 and it is made possible to more simply determine the registration mark.

As above, according to the present embodiment, even in a case where the registration mark for color registration correction and the reference mark for additional printing are printed at the same position in the sheet conveyance direction, the reference mark is not detected erroneously as the registration mark, and therefore, it is made possible to secure a printable area wider than that of the conventional method.

Modification Example 2

In the embodiment described above, all the registration marks corresponding to each ink color are printed between the reference marks adjacent to each other, but provided that the interval between the reference marks adjacent to each other is short, there is a case where the registration marks of all the ink colors are not included in the interval. Consequently, an aspect is explained as a modification example 2 in which the registration marks are dispersed and printed between the reference marks.

Figure 12:
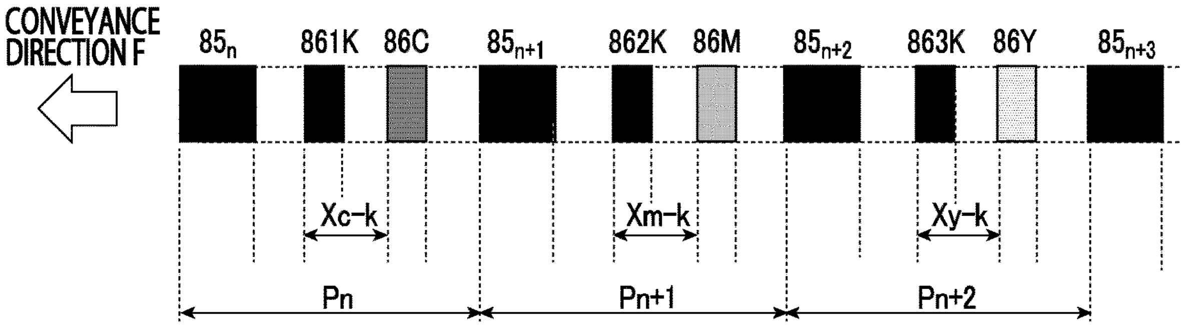
FIG. 12 is a sheet top diagram showing a printing position of a registration mark corresponding to each ink color.

FIG. 12 is a top diagram of the sheet SH showing the printing position of the registration mark corresponding to each ink color according to the present modification example. In a case of the present modification example, pairs of the registration marks 86 of two colors are dispersed and printed, which each include a combination of the reference color and the non-reference color. In FIG. 12, in an interval Pn between the reference mark 85$_n$ and the reference mark 85$_{n+1}$ adjacent to each other, as the cyan color registration correction, a registration mark 861K of black, which is the reference color, and the registration mark 86C of cyan, which is the non-reference color, are printed. Further, in an interval $P_{n+1}$ between the reference mark 85$_{n+1}$ and the reference mark 85$_{n+2}$, as the magenta color registration correction, a registration mark 862K of black, which is the reference color, and the registration mark 86M of magenta, which is the non-reference color, are printed. Furthermore, in an interval $P_{n+2}$ between the reference mark 85$_{n+2}$ and the reference mark 85$_{n+3}$, as the yellow color registration correction, a registration mark 863K of black, which is the reference color, and the registration mark 86Y of yellow, which is the non-reference color, are printed. As described above, by printing the registration marks 86 in a dispersed manner between the reference marks 85 adjacent to each other for each target color of the color registration correction, it is possible to print the necessary registration marks even in a case where the interval between the reference marks is narrow. In the example in FIG. 12, the registration mark of the reference color is printed first and next, the registration mark of the non-reference color is printed, but the printing order may be opposite. Further, in the example described above, the reference color is taken to be black, but the reference color may be the color other than black (that is, one of cyan, magenta, and yellow).

The printing of the registration mark according to the present modification example is performed as follows. Then, in the subsequent detection of the registration mark (S503), the registration mark is detected by the registration mark determination method explained in the modification example 1. Then, for example, as shown in FIG. 12, from the detection timing of the registration mark 86C of cyan and the detection timing of the registration mark 861K of black, a mark interval Xc−k is calculated. Further, from the detection timing of the registration mark 86M of magenta and the detection timing of the registration mark 862K of black, a mark interval Xm−k is calculated. Furthermore, from the detection timing of the registration mark 86Y of yellow and the detection timing of the registration mark 863K of black, a mark interval Xy−k is calculated. Then, the positional shift amounts ΔXc−k, ΔXm−k, and ΔXy−k of each color are found by using formulas (1) to (3) described previously as in the first embodiment. At this time, in the present modification example, all the ideal intervals $Xid_{c-k}$, $Xid_{m-k}$, and $Xid_{y-k}$ are equal to one another. After the registration mark detection processing is completed, the color registration correction based on the found positional shift amounts ΔXc−k, ΔXm−k, and ΔXy−k of each color is started.

Although the example is explained in which each combination of a pair of registration marks of two colors including the reference color and one of the non-reference colors is dispersed, it may also be possible to disperse each combination of registration marks of three or more colors in accordance with the length of the interval between the reference marks. For example, it may also be possible to print a combination of registration marks of three colors of black, cyan, and magenta first, and then print a combination of registration marks of two colors of black and yellow, and so on.

Modification Example 3

In the embodiment described above, the color registration correction is started after finding the positional shift amounts of the registration marks of all the non-reference colors (cyan, magenta, yellow) in the registration mark detection processing, but this is not limited. It may also be possible to start the color registration correction in order from the color for which the positional shift amount is obtained first. This method is particularly effective in a case where the registration marks are printed in a dispersed manner as in, for example, the modification example 2 described above.

Figure 13:
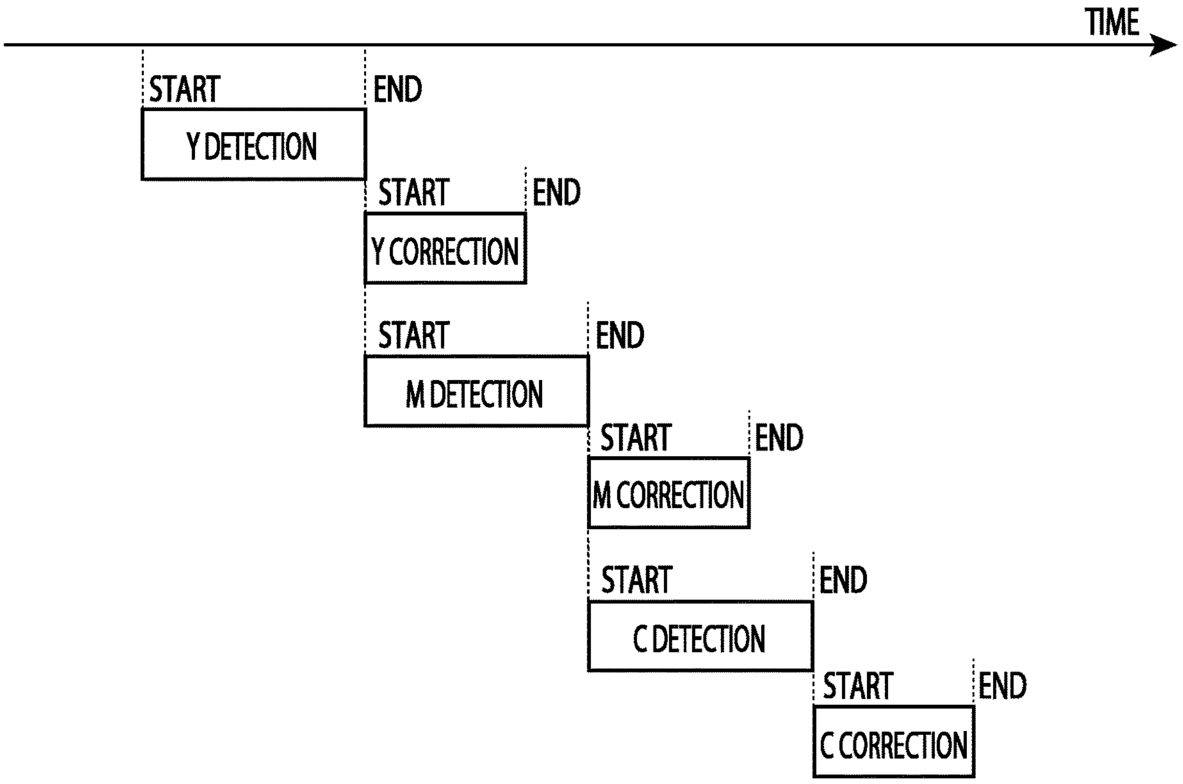
FIG. 13 is a timing chart showing a relationship in a time series between detection processing and color registration correction processing.

FIG. 13 is a timing chart showing a relationship in a time series between detection processing and color registration correction processing according to the present modification example. First, at the timing at which the registration mark of yellow is detected and the calculation of the positional shift amount ΔXy−k is completed, color registration correction is started immediately by taking only the color plane of yellow as a target. At this point in time, the color registration correction is not started for the color planes of magenta and cyan. Then, next, at the timing at which the registration mark of magenta is detected and the calculation of the positional shift amount ΔXm−k is completed, the color registration correction is started immediately by taking the color plane of magenta as a target. At this point in time, the color registration correction is not started for the color plane of cyan. Then, at the timing at which the registration mark of cyan is detected and the calculation of the positional shift amount ΔXc−k is completed, the color registration correction is started by taking the remaining color plane of cyan as a target. At this point in time, the color registration correction is performed for all the color planes of yellow, magenta, and cyan. As described above, by sequentially starting the color registration correction at the point in time at which the registration mark detection processing is completed for each color, it is possible to resolve the printing positional shift earlier. In the example described above, for the color plane of yellow, it is possible to resolve the printing positional shift earlier compared to the color planes of magenta and cyan, and for the color plane of magenta, it is possible to resolve the printing positional shift earlier compared to the color plane of cyan. Further, for the color plane of cyan for which the color registration correction processing is performed last, the starting timing of the color registration correction is the same as that in the embodiment described above and the timing is not delayed.

The order of the non-reference colors in a case where the registration mark is printed and detected is arbitrary, but it is desirable to print and detect the registration mark in order from the color whose positional shift amount with respect to black, which is the reference color, is most likely to increase. The reason is that the change in the interval between the line heads of CMYK due to the thermal expansion of the holding member of the line head, which is caused by the rise in temperature in a case where printing is continued, can be thought a large factor causing the shift in the printing position. That is, the longer the interval between the line heads, the more the positional shift amount increases. Because of this, the registration mark of black, which is the reference color, is printed first and then, the second and subsequent registration marks are printed in order from the registration mark of the line head farthest from the line head 22K. In a case of the line head configuration as shown in FIG. 6 and FIG. 7, the farthest line head from the line head 22K is the line head 22Y, and therefore, the registration mark of yellow is printed second and after that the registration marks of magenta and cyan are printed. Then, it is desirable to perform detection in this printing order.

Modification Example 4

Figure 14A:
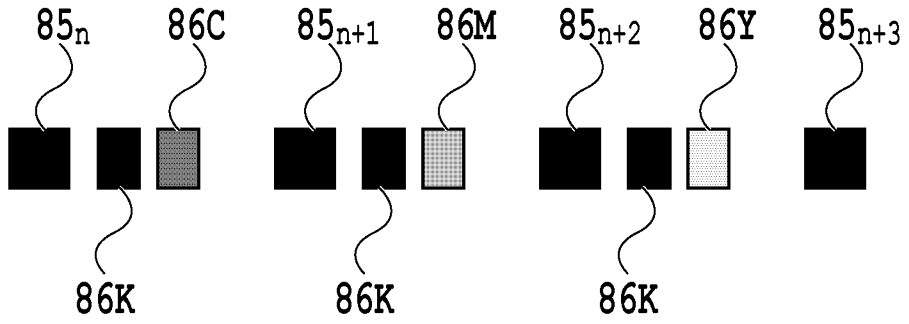
FIG. 14A and FIG. 14B are each a diagram explaining switching between registration mark printing methods.
Figure 14B:
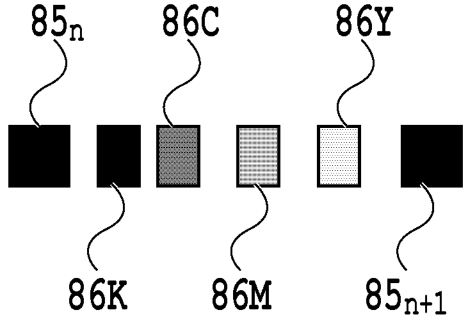

In a case where the method of printing registration marks in a dispersed manner explained in the modification example 2 is set as a default setting on the side of the apparatus even though the interval between the reference marks is sufficiently long, the time until the color registration correction is started for all the colors lengthens. Consequently, it may also be possible to switch the registration mark printing methods in accordance with the actual interval between the reference marks. Specifically, the interval between the reference marks is measured and in accordance with the measured value, whether the registration marks of all the colors are printed en bloc or they are printed in a dispersed manner is determined. That is, control is performed so that in a case where the measured value is less than a threshold value, the registration marks are printed for each pair of registration marks of two colors including the reference color and one of the non-reference colors as in FIG. 14A, and in a case where the measured value is larger than or equal to the threshold value, the registration marks of all the colors are printed en bloc as in FIG. 14B. Due to this, it is made possible to flexibly deal with both cases where the interval between the reference marks is long and where it is short.

As above, according to the present embodiments including each modification example, it is made possible to secure a printable area wider than that of the conventional method in a case where color registration correction is performed in additional printing.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to secure sufficiently wide printable area in a case where "registration correction" is performed in "additional printing".

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-088968, filed May 30, 2023 which is hereby incorporated by reference herein in its entirety.

What is claimed is:

1. A printing apparatus forming an image on a continuous sheet, comprising:

a first detection unit configured to detect a first mark on the continuous sheet indicating a formation position of the image;

an image formation unit configured to print a plurality of color planes corresponding to the image in an overlapping manner at the formation position indicated by the first mark detected by the first detection unit and print a plurality of second marks corresponding to each of the plurality of color planes on the continuous sheet;

a second detection unit configured to detect the plurality of second marks on the continuous sheet and calculate a positional shift amount in the sheet conveyance direction of a color plane of a color other than a reference color with respect to the color plane of the reference color among the plurality of color planes based on detection results of the plurality of second marks; and a control unit configured to adjust printing start timing of the color plane so as to resolve a shift in each of the color planes based on the positional shift amount calculated by the second detection unit, wherein the plurality of second marks is printed at an end portion of the continuous sheet so that at least part of the plurality of second marks overlaps the first mark in the sheet width direction, a detection range in the first detection unit and a detection range in the second detection unit overlap, in a case where the number of plurality of color planes is M, the image formation unit prints the M second marks side by side between the first marks adjacent to each other in the sheet conveyance direction, and the second detection unit calculates the positional shift amount taking detected M marks as the second mark by switching operation modes based on the color of the detected mark.

2. The printing apparatus according to claim 1, wherein the second detection unit:

moves the operation mode from a non-detection mode to a detection mode in a case of detecting a mark of a color other than the reference color; and calculates the positional shift amount taking marks detected in the detection mode as the second marks corresponding to each of the M color planes.

3. The printing apparatus according to claim 1, wherein the reference color is black and colors other than the reference color are cyan, magenta, and yellow.

4. The printing apparatus according to claim 1, wherein the control unit starts the adjustment sequentially from a color plane for which calculation of the positional shift amount is completed among the plurality of color planes.

5. The printing apparatus according to claim 4, wherein the image formation unit:

has a print head corresponding to each of the plurality of color planes, prints first the second mark of the color corresponding to the print head forming the color plane of the reference color, and prints the second and subsequent second marks in order from the second mark of the color corresponding to the print head farthest from the print head forming the color plane of the reference color among the plurality of print heads corresponding to the color planes of other than the reference color.

6. The printing apparatus according to claim 1, wherein the first detection unit measures an interval between the first marks adjacent to each other, and the image formation unit determines whether to print the M second marks side by side between the first marks adjacent to each other based on the interval between the first marks measured by the first detection unit.

7. A printing apparatus forming an image on a continuous sheet, comprising:

a first detection unit configured to detect a first mark on the continuous sheet indicating a formation position of the image;

an image formation unit configured to print a plurality of color planes corresponding to the image in an overlapping manner at the formation position indicated by the first mark detected by the first detection unit and print a plurality of second marks corresponding to each of the plurality of color planes on the continuous sheet;

a second detection unit configured to detect the plurality of second marks on the continuous sheet and calculate a positional shift amount in the sheet conveyance direction of a color plane of a color other than a reference color with respect to the color plane of the reference color among the plurality of color planes based on detection results of the plurality of second marks; and a control unit configured to adjust printing start timing of the color plane so as to resolve a shift in each of the color planes based on the positional shift amount calculated by the second detection unit, wherein the plurality of second marks is printed at an end portion of the continuous sheet so that at least part of the plurality of second marks overlaps the first mark in the sheet width direction;

a detection range in the first detection unit and a detection range in the second detection unit overlap, in a case where the number of plurality of color planes is M, the image formation unit prints the M second marks side by side in the sheet conveyance direction between the first marks adjacent to each other, and the second detection unit calculates the positional shift amount by determining whether the detected mark is the second mark based on the interval between the detected marks.

8. A printing apparatus forming an image on a continuous sheet, comprising:

a first detection unit configured to detect a first mark on the continuous sheet indicating a formation position of the image;

an image formation unit configured to print a plurality of color planes corresponding to the image in an overlapping manner at the formation position indicated by the first mark detected by the first detection unit and print a plurality of second marks corresponding to each of the plurality of color planes on the continuous sheet;

a second detection unit configured to detect the plurality of second marks on the continuous sheet and calculate a positional shift amount in the sheet conveyance direction of a color plane of a color other than a reference color with respect to the color plane of the reference color among the plurality of color planes based on detection results of the plurality of second marks; and a control unit configured to adjust printing start timing of the color plane so as to resolve a shift in each of the color planes based on the positional shift amount calculated by the second detection unit, wherein the plurality of second marks is printed at an end portion of the continuous sheet so that at least part of the plurality of second marks overlaps the first mark in the sheet width direction;

a detection range in the first detection unit and a detection range in the second detection unit overlap, the length of the first mark and the length of the second mark are different, in a case where the number of plurality of color planes is M, the image formation unit prints the M second marks side by side in the sheet conveyance direction between the first marks adjacent to each other, and the second detection unit calculates the positional shift amount by determining whether the detected mark is the second mark based on the length of the detected mark.

9. The printing apparatus according to claim 8, wherein the length of the second mark is shorter than the length of the first mark.

10. A printing apparatus forming an image on a continuous sheet, comprising:

a first detection unit configured to detect a first mark on the continuous sheet indicating a formation position of the image;

an image formation unit configured to print a plurality of color planes corresponding to the image in an overlapping manner at the formation position indicated by the first mark detected by the first detection unit and print a plurality of second marks corresponding to each of the plurality of color planes on the continuous sheet;

a second detection unit configured to detect the plurality of second marks on the continuous sheet and calculate a positional shift amount in the sheet conveyance direction of a color plane of a color other than a reference color with respect to the color plane of the reference color among the plurality of color planes based on detection results of the plurality of second marks; and a control unit configured to adjust printing start timing of the color plane so as to resolve a shift in each of the color planes based on the positional shift amount calculated by the second detection unit, wherein the plurality of second marks is printed at an end portion of the continuous sheet so that at least part of the plurality of second marks overlaps the first mark in the sheet width direction;

a detection range in the first detection unit and a detection range in the second detection unit overlap, the length of the first mark and the length of the second mark are different, in a case where the number of plurality of color planes is M, the image formation unit prints combinations of the second mark corresponding to the reference color and the second mark corresponding to at least one color of colors other than the reference color side by side between the first marks adjacent to each other in the sheet conveyance direction, and the second detection unit calculates the positional shift amount by determining whether the detected mark is the second mark based on the length of the detected mark.

11. The printing apparatus according to claim 10, wherein the combination is a combination of registration marks of two colors, that is, the reference color and one color of colors other than the reference color.

12. A control method of a printing apparatus forming an image on a continuous sheet, the control method comprising:

a first detection step of, by a first detection unit, detecting a first mark on the continuous sheet indicating a formation position of the image;

a printing step of, by an image formation unit, printing a plurality of color planes corresponding to the image in an overlapping manner at the formation position indicated by the first mark detected at the first detection step and printing a plurality of second marks corresponding to each of the plurality of color planes on the continuous sheet;

a second detection step of, by a second detection unit, detecting the plurality of second marks on the continuous sheet and calculating a positional shift amount in the sheet conveyance direction of a color plane of a color other than a reference color with respect to the color plane of the reference color among the plurality of color planes based on detection results of the plurality of second marks; and a control step of adjusting printing start timing of the color plane so as to resolve a shift in each of the color planes based on the positional shift amount calculated obtained at the second detection step, wherein the plurality of second marks is printed at an end portion of the continuous sheet so that at least part of the plurality of second marks overlaps the first mark in the sheet width direction, a detection range in the first detection unit and a detection range in the second detection unit overlap, in a case where the number of plurality of color planes is M, the image formation unit prints the M second marks side by side between the first marks adjacent to each other in the sheet conveyance direction, and the second detection unit calculates the positional shift amount taking detected M marks as the second mark by switching operation modes based on the color of the detected mark.

13. A non-transitory computer readable storage medium storing a program for causing a computer to perform a control method of a printing apparatus forming an image on a continuous sheet, the control method comprising:

a first detection step of, by a first detection unit, detecting a first mark on the continuous sheet indicating a formation position of the image;

a printing step of, by an image formation unit, printing a plurality of color planes corresponding to the image in an overlapping manner at the formation position indicated by the first mark detected at the first detection step and printing a plurality of second marks corresponding to each of the plurality of color planes on the continuous sheet;

a second detection step of, by a second detection unit, detecting the plurality of second marks on the continuous sheet and calculating a positional shift amount in the sheet conveyance direction of a color plane of a color other than a reference color with respect to the color plane of the reference color among the plurality of color planes based on detection results of the plurality of second marks; and a control step of adjusting printing start timing of the color plane so as to resolve a shift in each of the color planes based on the positional shift amount calculated obtained at the second detection step, wherein the plurality of second marks is printed at an end portion of the continuous sheet so that at least part of the plurality of second marks overlaps the first mark in the sheet width direction, part of the plurality of second marks overlaps the first mark in the sheet width direction;

a detection range in the first detection unit and a detection range in the second detection unit overlap, in a case where the number of the plurality of color planes is M, the image formation unit prints the M second marks side by side between the first marks adjacent to each other in the sheet conveyance direction, and the second detection unit calculates the positional shift amount taking detected M marks as the second mark by switching operation modes based on the color of the detected mark.

* * * * *